United States Patent [19]
Yamaguchi

[11] Patent Number: 5,162,946
[45] Date of Patent: Nov. 10, 1992

[54] ZOOM VIEWFINDER

[75] Inventor: Takao Yamaguchi, Yokohama, Japan

[73] Assignee: Ricoh Company, Ltd., Tokyo, Japan

[21] Appl. No.: 839,089

[22] Filed: Feb. 24, 1992

Related U.S. Application Data

[63] Continuation of Ser. No. 489,099, Mar. 6, 1990, abandoned.

[30] Foreign Application Priority Data

Mar. 7, 1989 [JP] Japan ................................. 1-54663

[51] Int. Cl.$^5$ ...................... G02B 15/00; G02B 7/099
[52] U.S. Cl. ............................... 359/676; 359/683; 354/199
[58] Field of Search ............... 350/422, 423, 429, 427; 354/199, 219, 222; 359/676, 683, 694, 672

[56] References Cited

U.S. PATENT DOCUMENTS 4,072,971  2/1978  Kuboshima ...................... 354/199
4,945,372  7/1990  Higuchi et al. .................. 354/199
4,967,219  10/1990  Morisawa et al. ............... 354/199

Primary Examiner—Paul M. Dzierzynski
Attorney, Agent, or Firm—Oblon, Spivak, McClelland, Maier & Neustadt

[57] ABSTRACT

A zoom viewfinder for forming a real image is used with a zoom camera lens system. The zoom camera lens system has an objective lens group. The zoom viewfinder comprises an objective lens system, an eyepiece lens system, and an element such as a mirror or a prism which is disposed between the objective lens system and the eyepiece lens system, for converting an observed image into an erect orthoscopic image. The objective lens system including an objective lens group. The objective lens group of the objective lens system and the objective lens group of the zoom camera lens system being movable in substantially aligned, juxtaposed relationship along respective optical axes which are parallel to each other.

3 Claims, 2 Drawing Sheets

ZOOM VIEWFINDER

This application is a continuation of application Ser. No. 07/489,099, filed on Mar. 6, 1990, now abandoned.

BACKGROUND OF THE INVENTION

The present invention relates to a zoom viewfinder, and more particularly to a viewfinder capable of zooming movement, for use with a zoom camera lens system of a lens shutter camera, a video camera, an SVC, or the like.

Some cameras, such as compact lens shutter cameras, have a viewfinder having its own optical axis which is in a position different from the optical axis of the camera lens system. Since the optical axes of the viewfinder and the camera lens system, there is a difference in viewpoint between the viewfinder and the camera lens system, a phenomenon known as the viewfinder parallax.

There have recently been developed compact lens shutter cameras with variable magnification. When such a camera makes zooming movement, the camera lens barrel is extended. At this time, the lens barrel may get into the viewfinder field, resulting in vignetting of light rays passing through the viewfinder.

To avoid the vignetting, it is necessary to keep the optical axes of the zoom camera lens system and the zoom viewfinder sufficiently away from each other. This solution then causes the parallax to be increased.

Efforts to improve zoom camera lens systems are always directed to an increase in the magnification ratio and a reduction in the close distance, among other things. However, increases in the magnification ratio and reductions in the close distance also result in an increase in the parallax, thus impairing the zoom viewfinder function unless some suitable measures are taken. There has been proposed no solution for solving the problem of the increased parallax.

SUMMARY OF THE INVENTION

It is an object of the present invention to provide a zoom viewfinder which minimizes the viewfinder parallax irrespective of an increase in the magnification ratio and a reduction in the close distance of a zoom camera lens system.

According to the present invention, a zoom viewfinder for forming a real image is used with a zoom camera lens system which has an objective lens group. The zoom viewfinder comprises an objective lens system, an eyepiece lens system, and an element such as a mirror or a prism which is disposed between the objective lens system and the eyepiece lens system, for converting an observed image into an erect orthoscopic image. The objective lens system including an objective lens group. The objective lens group of the objective lens system and the objective lens group of the zoom camera lens system being movable in substantially aligned, juxtaposed relationship along respective optical axes which are parallel to each other.

The optical axis of the zoom camera lens system and the optical axis of the zoom viewfinder lie parallel to each other. Upon zooming movement, the objective lens group of the zoom viewfinder and the objective lens group of the zoom camera lens system move in substantially aligned, juxtaposed relationship along the optical axes.

The zoom viewfinder of the present invention reduces the viewfinder parallax and allows a corrective action such as lateral displacement of the field frame to be easily carried out. Since the diameters of the lenses of the zoom viewfinder are not increased, a camera which incorporates the zoom viewfinder of the invention is rendered compact.

The above and other objects, features and advantages of the present invention will become more apparent from the following description when taken in conjunction with the accompanying drawings in which a preferred embodiment of the present invention is shown by way of illustrative example.

DETAILED DESCRIPTION

Figure 1A:
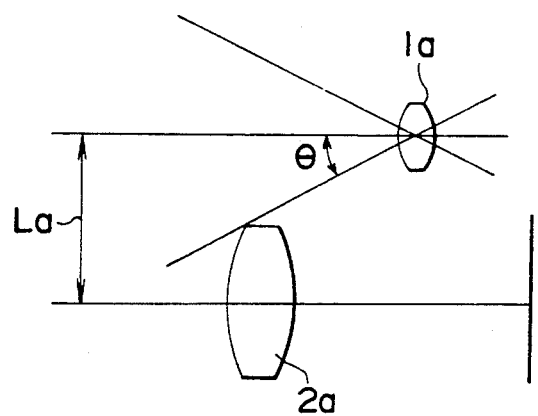
FIGS. 1(a) and 1(b) are diagrams illustrative of the principles of the present invention.
Figure 1B:
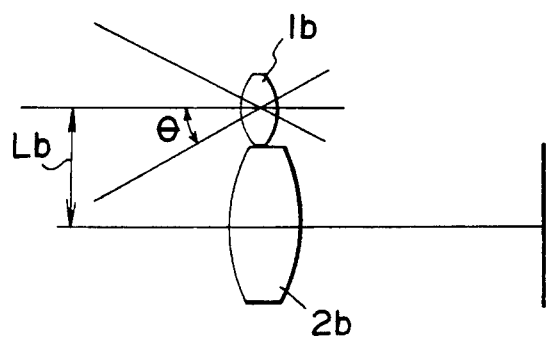

FIGS. 1(a) and 1(b) illustrate the principles of the present invention. FIG. 1(a) shows an objective lens group 2a of a zoom camera lens system, which is closest to an object to be photographed, and an objective lens group 1b of a viewfinder, which is also closest to the object. When the lens group 1a is positioned behind the lens group 2a as shown in FIG. 1(a), the optical axes of the zoom camera lens system and the viewfinder are required to be spaced from each other by a distance La so that the viewfinder has a half angle θ of view and vignetting of light rays by the lens group 2a is avoided.

When an objective lens group 2b of a zoom camera lens system and an objective lens group 1b of a zoom viewfinder are aligned with each other transversely of their optical axes, as shown in FIG. 1(b), i.e., when the objective lens groups 2b, 1b are not positioned one behind the other along the optical axes, light rays passing through the viewfinder are not subjected to vignetting which would otherwise be caused by the lens group 2b. The distance, indicated by Lb, between the optical axes at this time may be approximately the same as the sum of the largest lens radius of the zoom camera lens system and the largest lens radius of the zoom viewfinder, and is smaller than the distance La (La>Lb).

According to the present invention, upon zooming movement, the objective lens group of the zoom viewfinder and the objective lens group of the zoom camera lens system move along their respective parallel optical axes in substantially aligned, juxtaposed relation to each other transversely to the optical axes, so that these objective lens groups will not be positioned on behind the other along the optical axes. With the objective lens groups being relatively positioned as shown in FIG. 1(b) at all times, vignetting of light rays in the zoom viewfinder by the lens barrel of the zoom camera lens system can be prevented from happening.

Figure 2:
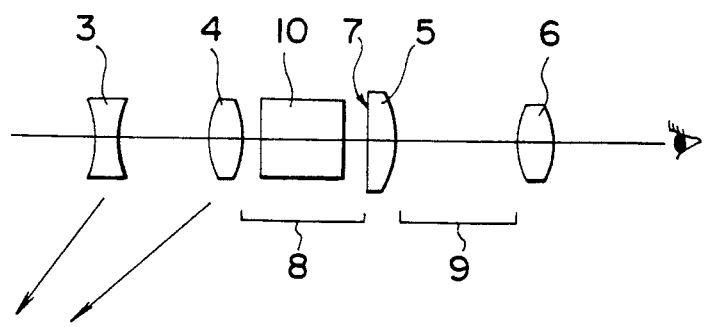
FIG. 2 is a schematic view of a zoom viewfinder according to the present invention.

FIG. 2 schematically shows a zoom viewfinder according to the present invention.

The zoom viewfinder includes a first lens group 3 having negative refracting power, and a second lens group 4 having positive refracting power. The first lens group 3 and the second lens group 4 jointly serve as an objective lens system, and move along the optical axis for varying the magnification while changing the distance therebetween.

The zoom viewfinder also includes a third lens group 5 in the form of a condenser lens, and a fourth lens group 6 serving as an eyepiece lens. A real image of an object formed by the objective lens system is focused on a focusing surface of the third lens group 5. There are spaces 8, 9 between the lens groups 4, 5, 6, and a mirror or prism 10 is disposed in the space 8 for converting the observed image into an erect orthoscopic image. The mirror or prism 10 may be disposed in the space 9.

Figure 3:
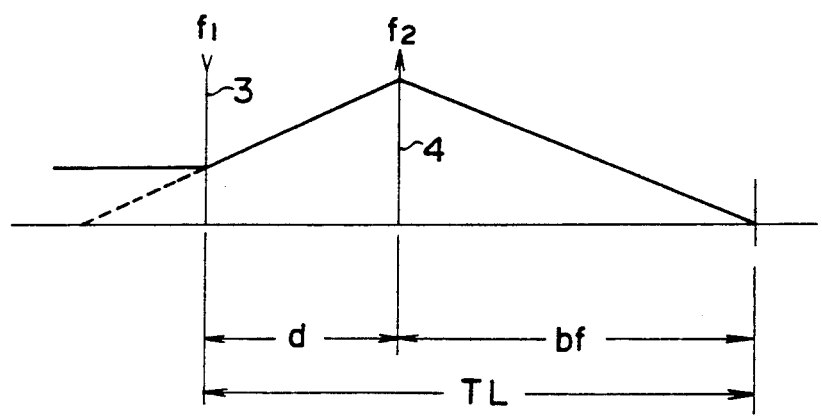
FIGS. 3 and 4 are diagrams showing the arrangement and operation of an objective lens system of the zoom viewfinder.

FIG. 3 shows the paraxial arrangement of the objective lens system. It is assumed that the first lens group 3 has a focal length $f_1$, the second lens group 4 has a focal length $f_2$, the first and second lens groups 3, 4 are spaced a distance d from each other, the second lens group 4 is spaced from the focusing surface by a distance bf, which is the back focus of the objective lens system, the first lens group 3 is spaced from the focusing surface by a distance TL, which is the entire length of the objective lens system, and the second lens group 4 has a lateral magnification $m_2$. The entire length TL of the objective lens system is now given as follows:

$$TL = f_1 - \{f_2(1-m_2)^2/m_2\} \quad (1)$$

The lateral magnification $m_2$ of the second lens group 4 has a negative value. As can be understood from the equation (1), the length TL is minimum, i.e., $f_1 + 4f_2$ when $m_2 = -1$, and becomes larger if m, is greater or smaller than $-1$.

The composite focal length F of the objective lens system is expressed by:

$$F = f_1 \cdot m_2 \quad (2)$$

The equations (1) and (2) above indicate that, when the zoom viewfinder is zoomed in the range of $m_2 < -1$, the length TL is smaller when the focal length is shorter, and the length TL is larger when the focal length is longer. Therefore, if a zoom camera lens system which is combined with the zoom viewfinder of the present invention is of the type which increases its total length from the shorter focal length end to the longer focal length end upon zooming movement, then it is possible, in the range of $m_2 < -1$, to move the objective lens system of the zoom viewfinder in the same direction as the zoom camera lens system when it changes its total length.

If a zoom camera lens system combined with the zoom viewfinder moves conversely, then it is possible, in the range of $m_2 > -1$, to move the objective lens system of the zoom viewfinder in the same direction as the zoom camera lens system when it changes its total length.

For illustrative purpose, the zoom viewfinder according to the embodiment of the present invention is combined with a zoom camera lens system of the type which increases its total length from the shorter focal length end to the longer focal length end upon zooming movement.

Using the equation (1), a change in the entire length of the objective lens system of the zoom viewfinder, i.e., a displacement Δ of the first lens group 3, is calculated as follows:

$$\Delta = -f_2[\{(1-m_{2T})^2/(m_{2T})\} - \{(1-m_{2W})^2/(m_{2W})\}] \quad (3)$$

where $m_{2T}$ and $m_{2W}$ are the lateral magnifications of the second lens group 4 at the longer and shorter focal length ends, respectively.

If the magnification ratio, i.e., $(m_{2T}/m_{2W})$, is indicated by k, then the equation (3) is rewritten as:

$$\Delta = -f_2 \cdot \{1 - k + (k^2 - k)m_{2W}^2\}/(k \cdot m_{2W}) \quad (4)$$

If the equation (2) is applied to the shorter focal length end, then the composite focal length $F_W$ of the objective lens system is as follows:

$$F_W = f_1 \cdot m_{2W} \quad (5)$$

Therefore, if the displacement Δ is determined as a displacement placement of the zoom camera lens system, then the power distribution of the objective lens system for giving the displacement as the dispacement Δ to the first lens group 3 can be determined.

Table, below, shows the power and arrangement of the first lens group 3 and the second lens group 4 of the zoom viewfinder when the zoom camera lens system comprises three lens groups having negative, positive, and negative refracting power, respectively.

TABLE

|  | Zoom viewfinder | Zoom camera lens system |
|---|---|---|
| Group focal length |  |  |
| 1st Group | −13 | −60 |
| 2nd Group | 20.508 | 26 |
| 3rd Group |  | −35.921 |
| Displacement |  |  |
| Shorter focal length | 0 (FW = 15) | 0 (FW = 36) |
| Intermediate focal length | 10.13 (FM = 26.25) | 10.754 (FM = 63) |
| Longer focal length | 31.882 (FT = 42.5) | 31.882 (FT = 102) |

Figure 4:
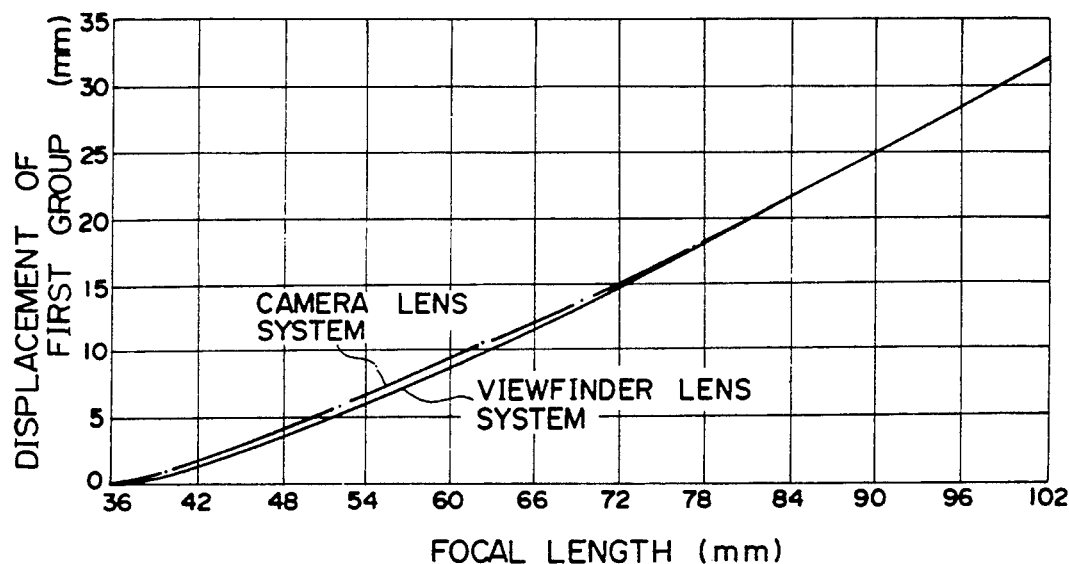

The numerals in Table above are expressed in mm. The displacement in Table indicates the displacement of the first lens group of each of the zoom viewfinder and the zoom camera lens system with reference to the shorter focal length of the zoom camera lens system. $F_W$, $F_M$, $F_T$ indicate the composite focal lengths at the shorter, intermediate, and longer focal lengths. The displacement of the first lens group, upon zooming movement thereof, of each of the zoom viewfinder and the zoom camera lens system is shown in FIG. 4. The horizontal axis of the graph of FIG. represents the focal length of the zoom camera lens system.

While there is a light difference between the first lens group of the zoom viewfinder and the first lens group of the zoom camera lens system, these first lens groups can easily be moved in the manner shown in FIG. 4 by the use of a cam. If the above slight difference is neglected and the first lens groups of the zoom viewfinder and the zoom camera lens system are moved in unison with each other, the magnification and field ratio of the zoom viewfinder slightly differ from predetermined values due to the neglected difference. However, such differences of the magnification and field ratio are not problematic as the neglected difference is very small as shown in FIG. 4. Therefore, the first lens groups of the zoom viewfinder and the zoom camera lens system may be moved in unison with each other.

Effects of the present invention on the parallax according to the example given in Table above are calculated below.

If the field ratio of the viewfinder is 85%, then the half angle of view of the viewfinder is 10.2 degrees when the zoom camera lens system has a longer focal length ($F_T = 102$ mm).

Figure 5:
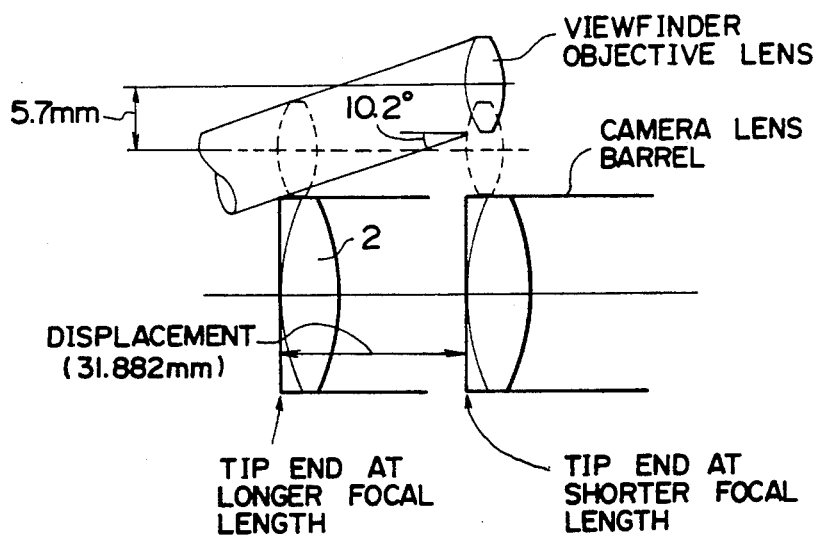
FIG. 5 is a view illustrative of advantages of the present invention as compared with a zoom viewfinder which does not incorporate the principles of the invention.

It is assumed that the principles of the invention were not incorporated, i.e., the objective lens system of the zoom viewfinder were fixed, and the first lens group of the zoom viewfinder were fixed in the same position as the first lens group of the zoom camera lens system at the shorter focal length end. Then, at the longer focal length end, the first lens group 2 of the zoom camera lens system would be moved 31.882 mm forwardly from its position at the shorter focal length end, i.e., from the position of the first lens group 3 of the zoom viewfinder, as shown in FIG. 5. In order to avoid vignetting of light rays in the viewfinder, the optical axis of the viewfinder would have to be displaced 5.7 mm ($= 31.882 \times \tan 10.2°$) from the optical axis (indicated by the broken line) as is the case with the invention, in a direction away from the optical axis of the zoom camera lens system. As a result, the parallax would be increased correspondingly.

Although a certain preferred embodiment has been shown and described, it should be understood that many changes and modifications may be made therein without departing from the scope of the appended claims.

What is claimed is:

1. A zoom viewfinder and zoom camera lens system combination, compising:
   a zoom camera lens system having at least one objective lens group; and
   a zoom viewfinder comprising:
      an objective lens system;
      an eyepiece lens system; and
      means disposed between said objective lens system and said eyepiece lens system, for converting an observed image into an erect orthoscopic image;
   said objective lens system includign at least one objective lens group, said objective lens group including the lens of the zoom viewfinder which is nearest the object, an objective lens group located nearest the object in said objective lens system and an objective lens group located nearest the object in said zoom camera lens system being movable in substantially aligned, juxtaposed relationship during zooming along respective optical axes which are parallel to each other.

2. A zoom viewfinder and zoom camera lens system combination, comprising:
   a zoom camera lens system having at leastone objective lens group; and
   a zoom viewfinder comprising:
   an objective lens system including two lens groups;
   an eyepiece lens system; and
   means, disposed between said objective lens system and said eyepiece lens system, for converting an observed image into an erect orthoscopic image;
   one of said lens groups of said objective lens system having negative refracting power, the other of said lens groups having positive refracting power, said lens grups being successively arranged in the named order from an object side;
   said lens gorup having negative refracting power of said objective lens system and an objective lens group located nearest the object in said zoom camera lens system being movable in substantially aligned, juxtaposed relationsip during zooming along respective optical axes which are parallel to each other.

3. A zoom viewfinder and zoom camera lens system combination according to claim 1, wherein the zoom viewfinder forms a real image.

* * * * *